June 30, 1925.
A. D. TRENOR
1,544,049
SYSTEM FOR THE CONTROL OF DIRIGIBLE DEVICES FROM A DISTANCE
Original Filed March 31, 1916    6 Sheets-Sheet 2
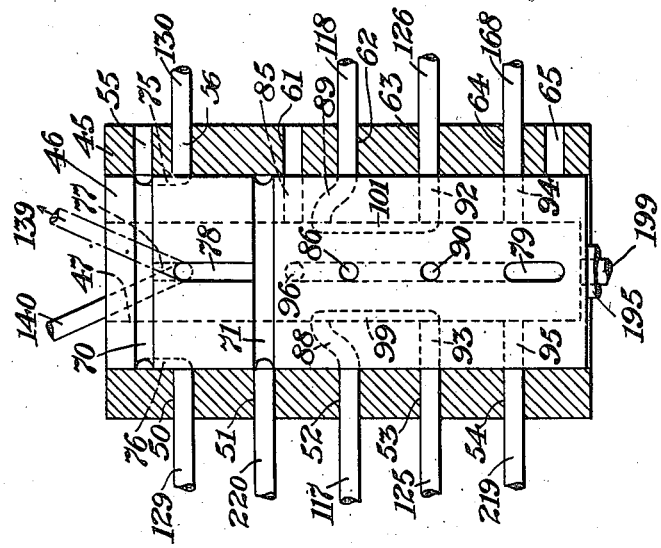
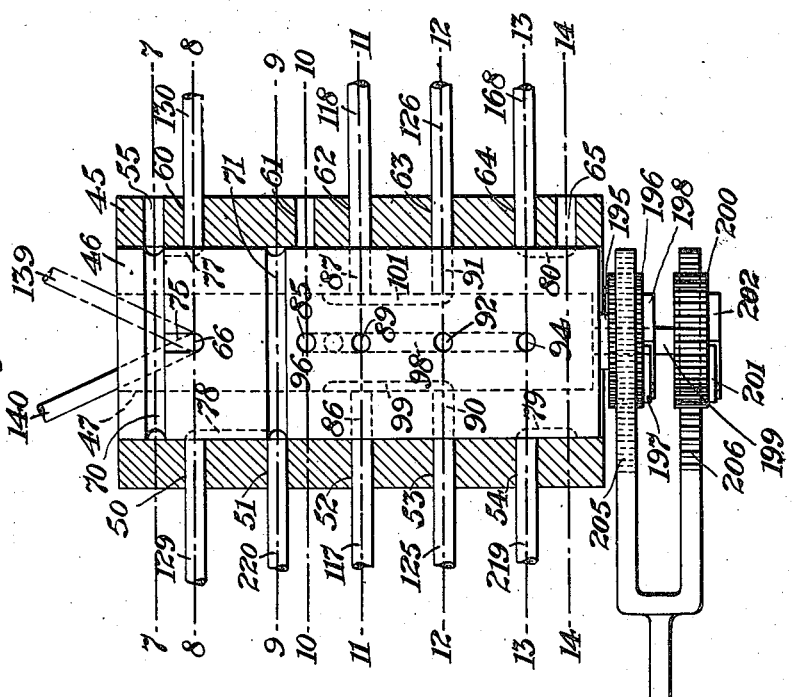
WITNESS
Chas. F. Clagett
INVENTOR
Albert D. Trenor
BY
A. J. Gardner
HIS ATTORNEY

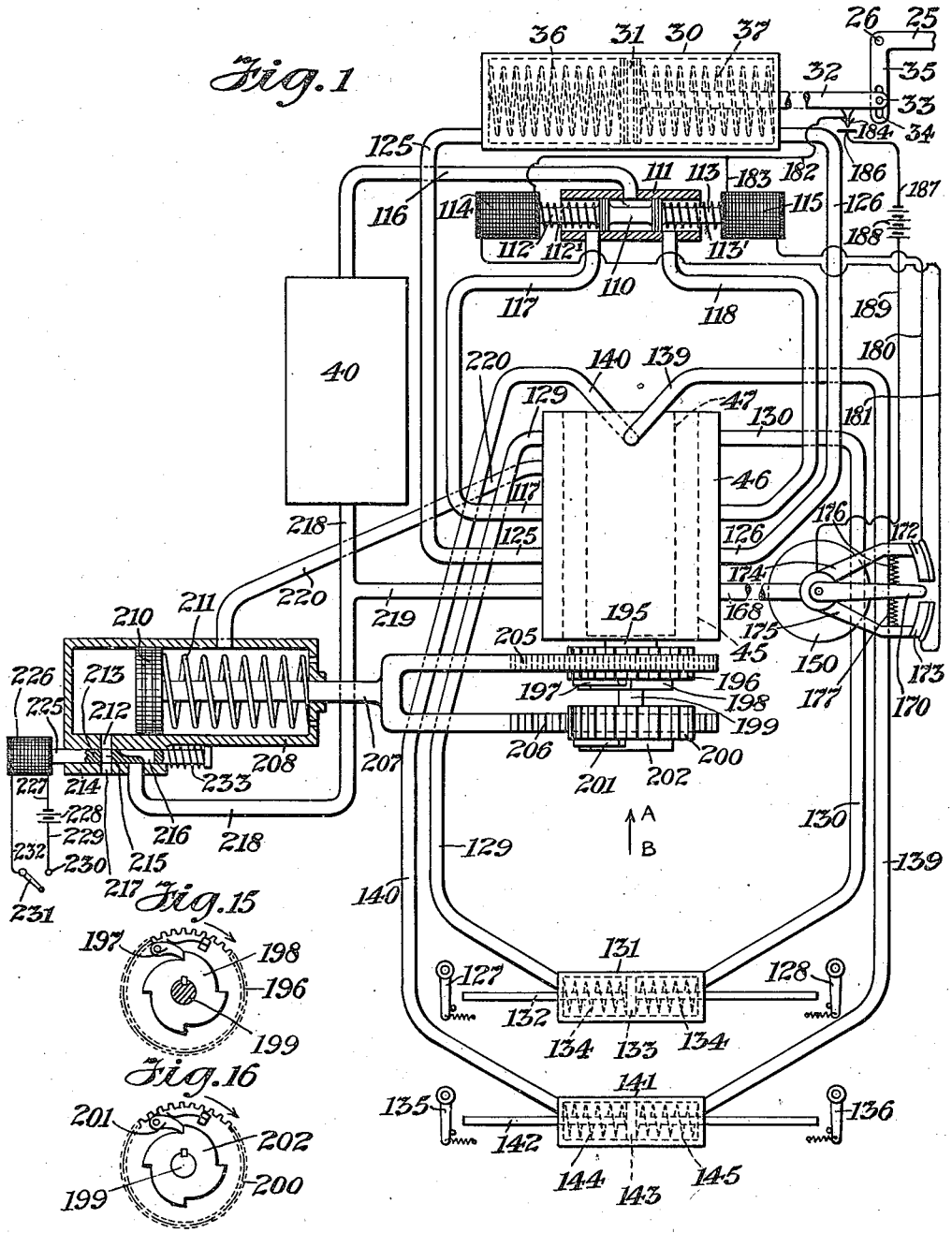

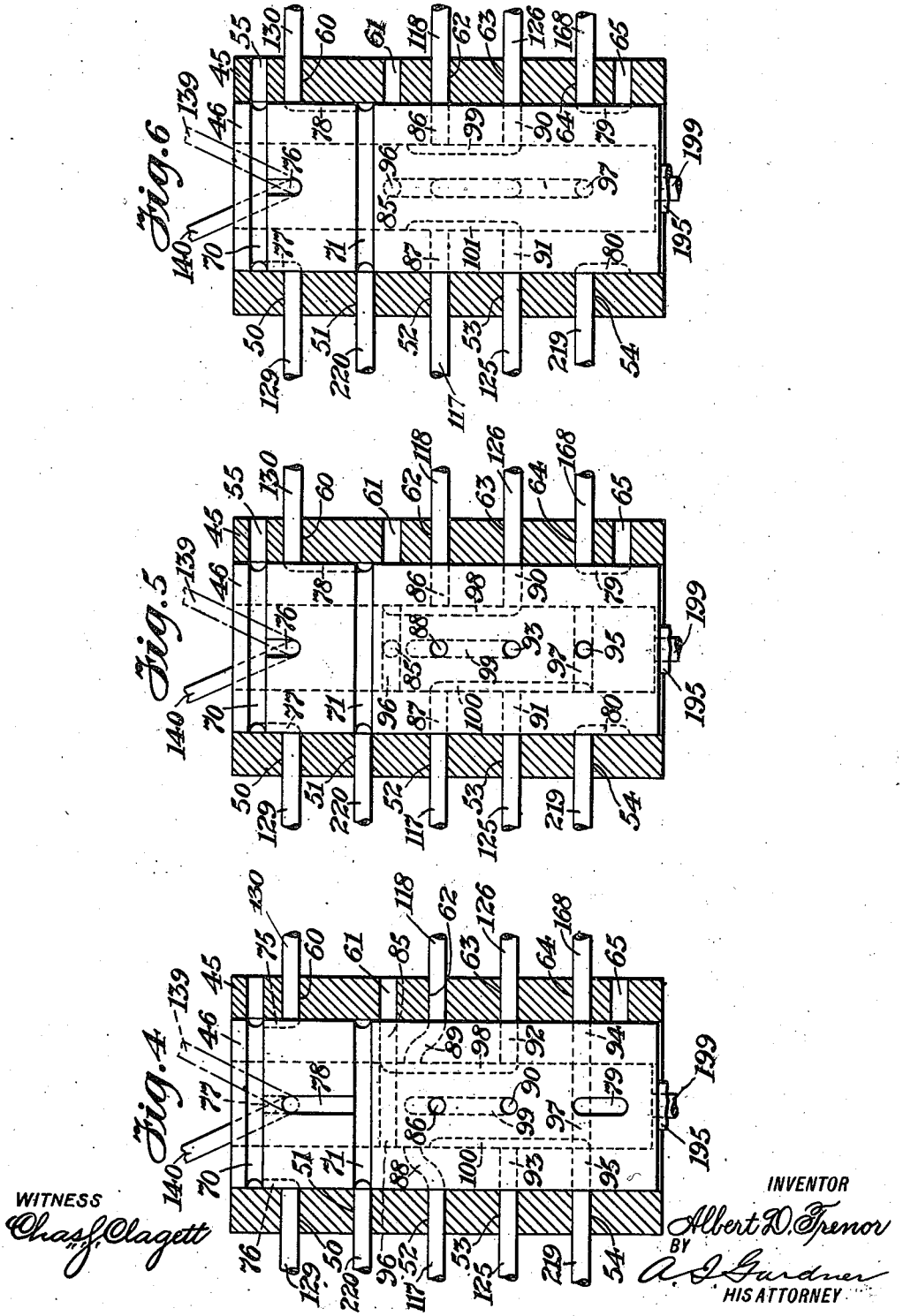

June 30, 1925.
A. D. TRENOR
1,544,049
SYSTEM FOR THE CONTROL OF DIRIGIBLE DEVICES FROM A DISTANCE
Original Filed March 31, 1916    6 Sheets-Sheet 4
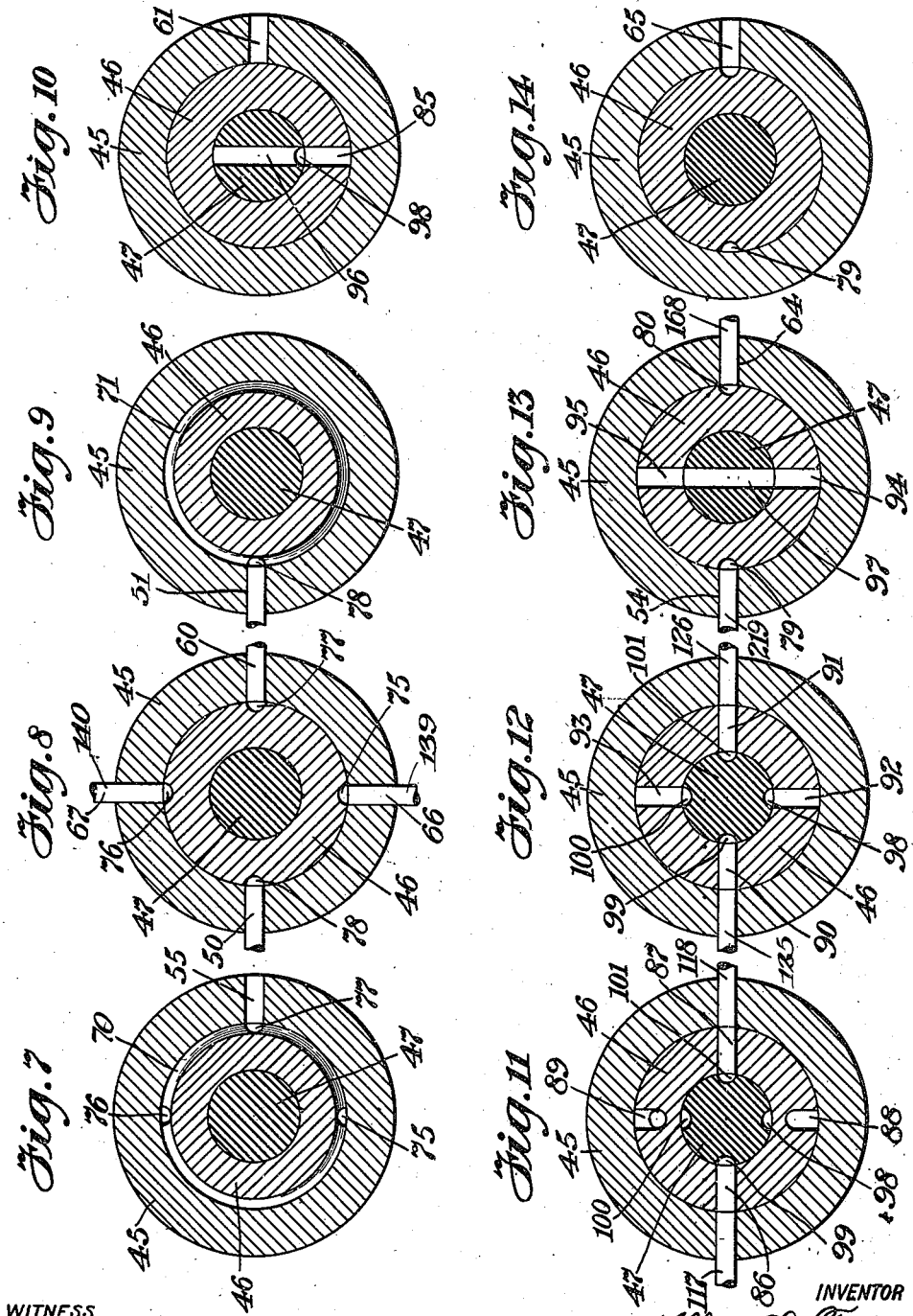

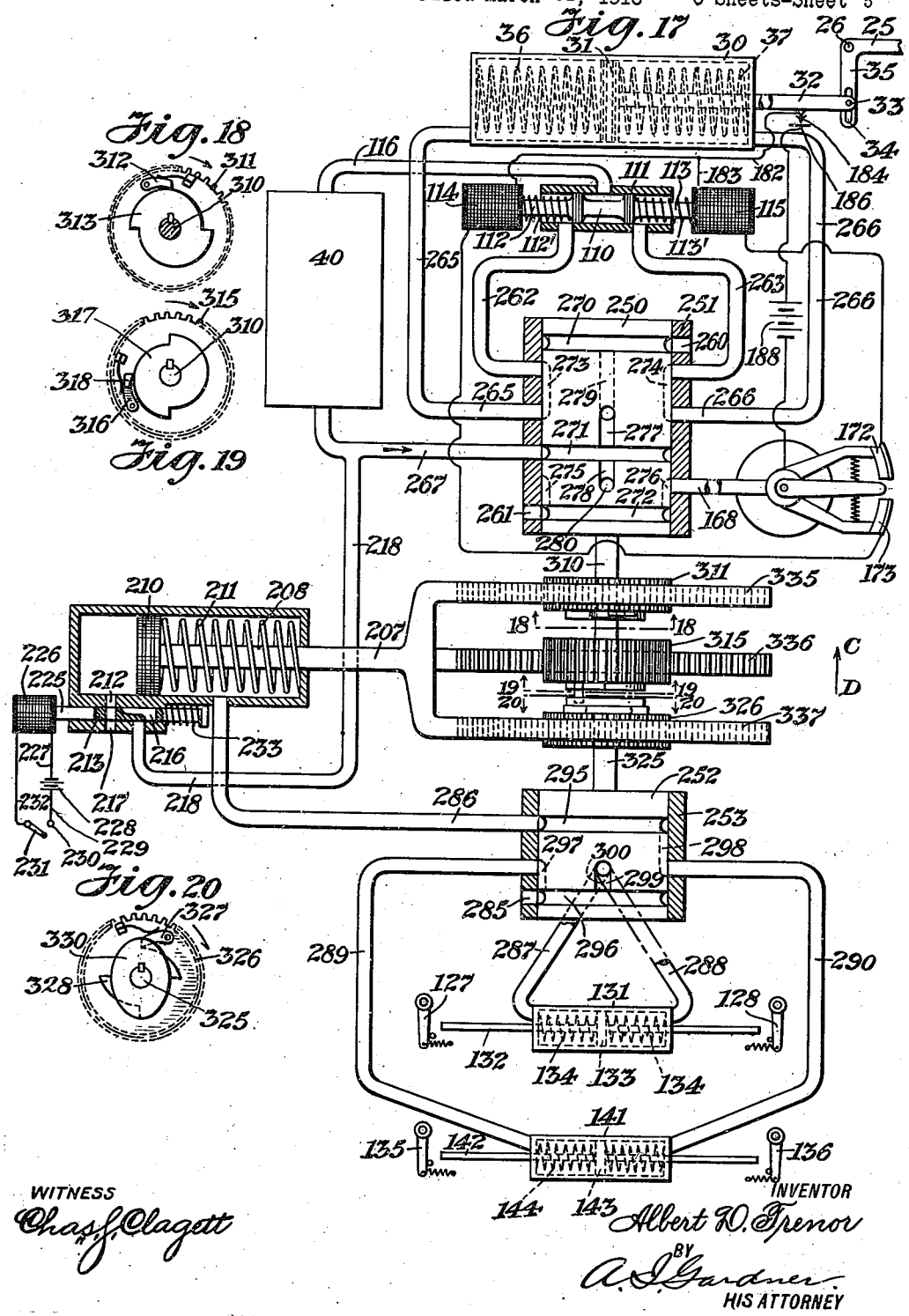

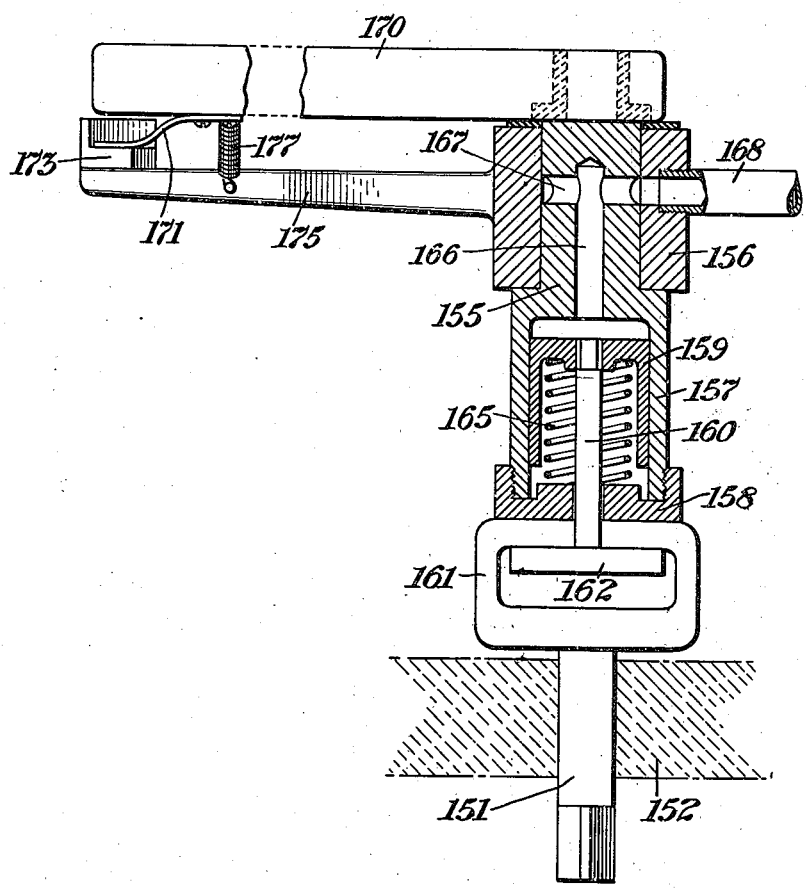

Patented June 30, 1925.

1,544,049

UNITED STATES PATENT OFFICE.

ALBERT DELAFIELD TRENOR, OF GLOUCESTER, MASSACHUSETTS, ASSIGNOR TO JOHN HAYS HAMMOND, JR., OF GLOUCESTER, MASSACHUSETTS.

SYSTEM FOR THE CONTROL OF DIRIGIBLE DEVICES FROM A DISTANCE.

Application filed March 31, 1916, Serial No. 88,052. Renewed August 25, 1923.

*To all whom it may concern:*

Be it known that I, ALBERT D. TRENOR, a citizen of the United States, and a resident of the city of Gloucester, county of Essex, and State of Massachusetts, have invented a certain new and useful System for the Control of Dirigible Devices from a Distance, of which the following is a specification.

One of the objects of this invention is to provide an improved system for the control of a dirigible device and more particularly, for the selective control from a distance of a plurality of prime movers carried by the dirigible device and arranged to perform a variety of functions.

Further objects of this invention are to provide in a system of distant control, improved means whereby the control of the system from a distance will be facilitated and expedited, and whereby the selective control of a plurality of functioning devices included in the system may be effected by a reduced number of impulses or signals received from a distance; and to provide other improvements as will appear hereinafter.

In the accompanying drawings, Fig. 1 is a diagrammatic plan view partly in section of a system embodying one form of this invention; Figs. 2, 3, 4, 5 and 6 are enlarged longitudinal sections showing certain parts of the same in various positions; Figs. 7 to 14 are enlarged transverse sections on lines 7—7 to 14—14 respectively of Fig. 2; Figs. 15 and 16 are end views of details of the same; Fig. 17 a diagrammatic plan view partly in section of a modified form of this invention; Figs. 18, 19 and 20 are sections on lines 18—18, 19—19 and 20—20 respectively looking in the direction of the arrows; and Fig. 21 is an enlarged longitudinal section of a detail forming a part of each form of this invention.

Referring to the drawings, one embodiment of this invention comprises any suitable dirigible device, for instance, a marine vessel (not shown), which is provided with a rudder 25 pivotally connected thereto as at 26 to swing with respect thereto about a fixed axis. To oscillate the rudder 25 about its pivot 26 under pneumatic pressure, a cylinder 30 is rigidly secured to the vessel and is provided with a piston 31 arranged to reciprocate therein and which is rigidly secured to one end of a piston rod 32, the other end of which has fixed therein a pin 33 which engages slidably in a slot 34 of an arm 35 which is rigid with the rudder 25 and whereby the rudder 25 may be oscillated. The piston 31 is normally yieldingly held in a central position in its cylinder 30 and consequently the rudder is normally held yieldingly in a central position by means of two spiral springs 36 and 37 arranged within the cylinder 30 and upon opposite ends of the piston 31. For supplying compressed air to the cylinder 30 and to other devices mounted upon the vessel to perform various functions as will appear hereinafter, a tank 40 or other suitable source of air or other fluid under pressure is mounted upon the vessel and is connected to the various devices as will be described hereafter.

For controlling the distribution of fluid under pressure from the source 40 to various fluid actuated devices on the vessel, a main distributing valve is provided comprising a cylindrical valve casing 45 in which is snugly but rotatably fitted a sleeve 46, and in this sleeve is snugly but rotatably arranged an inner cylindrical valve member 47. The valve casing 45 is provided on one side with five ports, 50, 51, 52, 53 and 54, and upon its opposite side with seven ports 55, 60, 61, 62, 63, 64 and 65. The valve casing 45 is also provided with two oppositely arranged ports 66 and 67 which extend in a direction substantially perpendicular to the plane of the remaining ports through the valve casing. The valve sleeve 46 is provided with two annular recesses 70 and 71, and six longitudinal recesses 75, 76, 77, 78, 79 and 80. The valve sleeve 46 is also provided with eleven transverse ports 85, 86, 87, 88, 89, 90, 91, 92, 93, 94 and 95. The inner valve member 47 is provided with two transverse ports 96 and 97 and with four longitudinal passages 98, 99, 100 and 101.

For automatically controlling the flow of compressed fluid from the tank or source 40 through the valve casing 45 to maintain the vessel automatically upon a predetermined course, as will appear hereinafter, an auxiliary valve 110 is arranged to reciprocate in a fixed auxiliary valve casing 111, and the opposite ends of this valve 110 are extended to form cores 112 and 113 which reciprocate in fixed solenoids 114 and 115 respectively. The valve 110 is normally held central by the springs 112' and 113'. The valve casing 111 is provided with an inlet pipe 116 which connects the valve casing with the source 40 of compressed air, and the valve casing 111 is connected by two oppositely disposed pipes 117 and 118 with the oppositely disposed ports 52 and 62 of the main valve casing 45. The piston valve 110 is provided with an annular recess 120 and the valve is so arranged that when the valve is in a central position, as shown in Fig. 1, no air will be allowed to flow from the inlet pipe 116 through the valve casing 111, and the two pipes 117 and 118 will be permitted to exhaust through the open ends of the valve casing 111. When the left hand solenoid 114 is energized, the auxiliary valve 110 will be drawn to the left a sufficient distance to connect the inlet pipe 116 with the left hand pipe 117, and to leave the right hand pipe 118 open to exhaust through the right hand end of the valve casing 111, but when the current is broken through the left hand solenoid 114 and the right hand solenoid 115 is energized, the auxiliary valve 110 will be drawn to the right a distance sufficient to connect the inlet pipe 116 with the right hand pipe 118, and to leave the left hand pipe 117 open to exhaust through the left hand end of the casing 111.

For pneumatically controlling the steering piston 31, the opposite ends of the steering cylinder 30 are connected by pipes 125 and 126 with the ports 53 and 63 respectively of the main valve casing 45, and for pneumatically controlling a plurality of operative devices 127 and 128 mounted upon the vessel, the oppositely disposed ports 50 and 60 of the main controlling valve casing 45 are connected by pipes 129 and 130 with the opposite ends of a fixed cylinder 131 through which extends a reciprocatory piston rod 132 upon which is rigidly secured a piston 133 which is normally held in a central position in the cylinder 131 by oppositely disposed springs 134. For controlling other devices 135 and 136 upon the vessel, the oppositely disposed ports 66 and 67 of the main valve casing 45 are connected by pipes 139 and 140 with the opposite ends of a fixed cylinder 141 through which extends a reciprocatory piston rod 142 upon which is rigidly secured a piston 143 which is normally held centrally in the cylinder 141 by opposed spiral springs 144 and 145.

For automatically energizing the solenoids 114 and 115 to maintain the vessel upon a predetermined course, any suitable direction maintaining means may be provided, but in the form of the invention shown there is provided for this purpose in a suitable casing 150 a gyroscope which is provided with a stem 151 which is arranged to rotate with respect to the vessel in a suitable bearing 152 fixed with respect to the vessel, the stem 151 being held by the gyroscope against rotation in space with respect to its longitudinal axis. In longitudinal alinement with the stem 151 is a spindle 155 which is arranged to rotate in a fixed bearing 156. The lower portion of this spindle is in the form of a hollow cylinder 157 having a cap 158 fixed over its lower end and within this cylinder is arranged to reciprocate a piston 159 which is fixed upon the upper end of a piston rod 160, the lower portion of which projects slidably through the head 158 and through a yoke 161 fixed upon the upper end of the stem 151 and the lower end of the piston rod 160 has fixed thereon a clamping disc 162 arranged to cooperate with the yoke 161 to clamp the yoke against the head 158 to hold the spindle 155 fixed with respect to the gyroscope stem 151. A compressed spiral spring 165 normally presses the piston 159 upwardly to clamp the yoke 161 to the head 158. For forcing the piston 159 downwardly to disconnect the spindle 155 from the stem 151, the upper portion of the cylinder 157 communicates through a longitudinal passage 166 with an annular passage 167 in the spindle 155, and through the annular passage 167 and a pipe 168 with the port 64 of the main valve casing 45. Fixed upon the upper end of the spindle 155 is an arm 170 which carries a yielding contact 171 which is arranged to engage alternately two fixed spaced contacts 172 and 173 which are carried by arms 174 and 175 rigid with the fixed bearing 156. The swinging arm 170 is normally held in a central position between the two stationary contacts 172 and 173 by means of opposed spiral springs 176 and 177 which connect the swinging arm 170 with the stationary arms 174 and 175 in such a manner that the yielding contact 171 is normally held between and out of contact with the fixed contacts 172 and 173. The two stationary contacts 172 and 173 are connected by wires 180 and 181 with the outer ends of the two solenoids 115 and 114 respectively, and the inner ends of these two solenoids are connected by wires 182 and 183 with a contact 184 carried by the piston rod 32 which controls the rudder and which is arranged to move into and out of engagement with a fixed contact plate 186 which is connected by a wire 187 with one pole of a battery 188 the other pole of which is connected by a wire 189 and through the swinging arm 170 with the yielding contact 171. The construction and connections are such that when the gyroscope stem 151 is connected to the swinging arm 170 through the connection of the clutch member 162, the vessel will be maintained substantially upon a predetermined course as will appear hereinafter.

For rotating the sleeve 46 and the inner valve member 47 independently of each other to control the distribution of fluid to the various devices on the vessel, one end of the sleeve 46 is provided with a cylindrical projection 195 coaxial therewith and rigidly secured thereto, and upon this projection 195 is loosely mounted a pinion 196 which has pivotally secured thereto a pawl 197 which is arranged to cooperate with a ratchet wheel 198 which is rigidly secured to the cylindrical projection 195, so as to turn the same in a clockwise direction when viewed in the direction of the arrow A—B. The inner valve member 47 is provided with a stem 199 rigid therewith which projects loosely through the cylindrical projection 195 and the ratchet wheel 198, and upon the outer end of this stem 199 is loosely mounted a pinion 200 which carries pivotally connected thereto a pawl 201 which is arranged to cooperate with a ratchet wheel 202 which is rigid with the outer end of the stem 199, so as to turn the stem 199 in a clockwise direction.

For rotating the two pinions 196 and 200, two substantially parallel racks 205 and 206 are arranged to engage the opposite sides of the two pinions respectively, and these racks are rigid with a piston rod 207 which is arranged to reciprocate in a fixed cylinder 208 and which has fixed upon its inner end a piston 210 arranged to reciprocate in the cylinder 208 and normally held in a predetermined position (as shown in Fig. 1), by a spiral spring 211 arranged in the cylinder 208. The outer end of this cylinder is provided with a port 212 controlled by a slide valve 213 arranged to reciprocate in a casing 214, and provided with two ports 215 and 216 arranged to place the port 212 of the cylinder in connection either with an exhaust port 217 or with an inlet pipe 218 leading from the valve casing 214 to the source 40 of compressed air, and connected by a branch pipe 219 with the port 54 of the main valve casing 45. The inner end of the cylinder 208 is connected by a pipe 220 with the port 51 of the main valve casing 45.

Any suitable means may be provided to reciprocate the slide valve 213, but in the form of this invention shown, the valve 213 is rigid with a core 225 which is arranged to reciprocate in a fixed solenoid 226, one end of which is connected by a wire 227 with one pole of a battery 228, the other pole of which is connected by a wire 229 with a fixed contact 230 which is arranged to be engaged by a pivoted switch 231 which is connected by a wire 232 with the other end of the solenoid 226. A spiral spring 233 normally holds the slide valve 213 in such a position that the port 212 of the cylinder is connected to the exhaust port 217, and the inner end of the inlet pipe 218 is held closed. When, however, the switch 231 is closed, and the solenoid 226 is thus energized, the slide valve 225 will be drawn towards the left in such a position as to close the exhaust port 217, and permit the inner end of the cylinder 208 to communicate with the inlet pipe 218 through the ports 212, 216. The switch 231 may be controlled in any suitable manner, either manually or by any suitable means, for instance, by well known means (not shown) responsive to radiant energy.

The construction and arrangement is such that when the switch 231 is closed and air is admitted into the outer end of the cylinder 208, the piston 210 will be forced to the right a sufficient distance to rotate the two pinions 196 and 200 in a clockwise and counter-clockwise direction respectively through 90 degrees each, and when the switch 231 is opened, the piston 210 will be returned by the spring 211 to its initial position shown in Fig. 1, and will return the pinions 196 and 200 in a counter-clockwise and clockwise direction respectively through ninety degrees. When the piston 210 is in its extreme right hand position, air is allowed to pass from the left hand end of the cylinder 208 into the pipe 220 to operate the mechanisms 127, 128, 135 or 136 when the movable valve ports 46 and 48 are in suitable positions, as will appear hereinafter.

In the operation of the form of the invention hereinbefore described and shown in Figs. 1 to 14 and Fig. 21, the torpedo boat is normally steered automatically upon a predetermined course through the action of the gyroscope 150 and the cooperating mechanisms, and for this purpose the movable parts 46 and 47 of the main controlling valve are normally arranged either as shown in Fig. 2 or as shown in Fig. 6, in which the movable valve parts 46 and 47 have been rotated clockwise through a half of a revolution respectively from the positions shown in Fig. 2.

Assuming that the movable valve parts 46 and 47 are in the positions shown in Fig. 2 for automatically controlling the course of the vessel, then the pipe 168 leading from the gyroscope clutch is open to exhaust through the port 64, longitudinal passage 80 and exhaust port 65, thus permitting the air to flow out of the upper end of the cylinder 157 to allow the spring 165 to press the piston 159 upwardly and to clamp the yoke 161 against the head 158, thus holding the spindle 155 and its arm 170 rigidly in fixed relation to the gyroscope stem 151, and when the arm is thus held, if the boat should deviate either to the right or to the left from its predetermined course, the yielding contact 171 carried by the arm 170 would make contact with the segmental contact 172 or the segmental contact 173 respectively. If the arm 170 and the rudder 25 are in central or neutral positions as shown in Fig. 1, and the main valve parts 46 and 47 are set as in Fig. 2, then if the boat deviates to the right the segmental contact 172 will swing with respect to the arm 170 and come into engagement with the yielding contact 171, whereupon the circuit will be closed from the segmental contact 172, through wire 180, right hand solenoid 115, wire 183, wire 182, movable contact 184, fixed contact plate 186, wire 187, battery 188, wire 189, arm 170 and yielding contact 171, whereupon the auxiliary valve 110 will be drawn towards the right and permit compressed air to flow from the tank 40 through the pipe 116, annular passage 120, pipe 118, port 62, port 87, longitudinal recess 101, port 91, port 63 and pipe 126, and into the right hand end of the steering cylinder 30 to push the piston 31 towards the left, thus swinging the rudder clockwise to restore the boat to its predetermined course. In this movement of the piston 31 towards the left, the left hand end of the cylinder 30 will be free to exhaust through the pipe 125, port 53, port 90, longitudinal passage 99, port 86, port 52, pipe 117 and left hand end of the auxiliary valve casing 111. When the piston 31 is moved a sufficient distance towards the left to cause the movable contact 184 to leave the plate 186, the circuit through the right hand solenoid 115 will be broken and the piston valve 110 will be restored to a central position by the springs 112' and 113', thus cutting off communication between the air tank 40 and the right hand end of the cylinder 30, and permitting the right hand end of the cylinder 30 to exhaust through the pipe 126, port 63, port 91, longitudinal recess 101, port 87, port 62, pipe 118, and right hand end of the auxiliary valve casing 111, and allowing the piston 31 to be returned to a central position by the springs 36 and 37. If now the boat is still diverted towards the right from its predetermined course, the process just described will be repeated until the boat is restored to its predetermined course. If the boat should deviate towards the left from its course, the segmental contact 173 would be brought into engagement with the yielding contact 171, and the current through the left hand solenoid 114 and through the battery 188 would be completed to place the left hand end of the steering cylinder 30 in communication with the air tank 40, and the right hand end of the cylinder 30 in communication with the exhaust through the right hand end of the auxiliary valve casing 111, and the boat would be restored to its course by a process the reverse of that just described for returning the boat to its predetermined course after it had been diverted therefrom towards the right.

When the movable parts 46 and 47 of the main controlling valve are in the positions shown in Fig. 6 for automatically controlling the course of the vessel, then the pipe 168 leading from the gyroscope clutch is open to exhaust through the port 64, longitudinal passage 79 and exhaust port 65; the pipe 117 is in communication with the pipe 125, through the ports 52, 87, longitudinal recess 101 and ports 91, 53; the pipe 118 is in communication with the pipe 126 through the ports 62, 86, longitudinal recess 99 and ports 90, 63; and the vessel is now under the control of the gyroscope as hereinbefore described. Under these conditions, when the vessel deviates either to the right or to the left from the predetermined course, the arm 170 will make contact either with the segmental contact 172 or the segmental contact 173, as the case may be, thus energizing the corresponding solenoid 115 or 114 to move the auxiliary valve 110 accordingly to admit air from the source 40 into the corresponding end of the steering cylinder 30 to restore the vessel to its predetermined course as hereinbefore described.

When the main air valve parts 46 and 47 are in the positions shown in Fig. 2, and the piston 210 is in its initial position, as shown in Fig. 1, and it is desired to move the piston 143 towards the left to operate the device 135, the switch 231 is closed, as for instance in response to an impulse of radiant energy thus energizing the solenoid 226 and causing the slide valve 213 to be moved towards the left thus admitting air from the source 40 through the pipe 218 and ports 216 and 212, and into the left hand end of the cylinder 208, and forcing the piston 210 towards the right and into its extreme right hand position at the right of the inlet to the pipe 220. This movement of the piston 210 towards the right moves the racks 205 and 206 towards the right and rotates the pinion 196 clockwise and the pinion 200 counter-clockwise through ninety degrees. This rotation of the pinion 196 will rotate the valve sleeve 46 clockwise through ninety degrees into the position shown in Fig. 3, but this rotation of the pinion 200 counter-clockwise will not effect the corresponding inner valve member 47, as the corresponding ratchet 202 operates only clockwise. As long as the switch 231 remains closed and the compressed air remains in the cylinder 208, the main valve members 46 and 47 will remain in the position shown in Fig. 3, and if the switch 231 is permitted to remain closed for a sufficient length of time, the compressed air will pass from the tank 40 through pipe 218, cylinder 208, pipe 220, port 51, annular recess 71, longitudinal recess 78, port 66 and pipe 139, and into the right hand end of the cylinder 141, thus forcing the piston 143 towards the left and actuating the device 135. During this movement of the piston 143 towards the left, the left hand end of the cylinder 141 will be open to exhaust through the pipe 140, port 67, longitudinal recess 77, annular recess 70 and exhaust port 55. Also while the movable parts 46 and 47 of the main valve are in the position shown in Fig. 3, the boat will remain under the control of the gyroscope, the air having been exhausted from the cylinder 157, and the pipe 168 being closed by the inner valve member 47.

When it is desired to move the piston 143 towards the right to operate the lower right hand device 136, the movable valve parts 46 and 47 are each rotated clockwise through a half of a revolution from the positions shown in Fig. 3 by opening and closing the switch 231 twice in succession to reciprocate the piston 210 twice, and upon its second closing the switch 231 is held closed for a sufficient time to permit the air to travel into the left hand end of the cylinder 141 and to exhaust from the right hand end of the cylinder by a process the reverse of that just described, thus forcing the piston 143 towards the right and operating the lower right hand device 136. During this operation of the device 136, the boat will be controlled as hereinbefore described by the gyroscope.

When the main valve parts are in the positions shown in Fig. 3 and it is desired to take over the control of the boat from the gyroscope and steer the boat towards the right from its predetermined course, the switch 231 is opened thus permitting the air to exhaust from the left hand end of the cylinder 208 and the racks 205 and 206 to move towards the left, thus rotating the pinion 196 counter-clockwise without changing the position of the valve sleeve 46, and rotating the pinion 200 clockwise through ninety degrees to rotate the inner valve member 47 clockwise through ninety degrees. The valve parts 46 and 47 will now be in the positions shown in Fig. 4 in which compressed air will be permitted to enter from the tank 40 through the pipes 218 and 219, port 54, port 95, port 97, port 94 and pipe 168 and into the clutch cylinder 157, thus depressing the piston 159 and disconnecting the arm 170 from the gyroscope stem 151 and rendering the gyroscope inoperative to control the boat, the arm 170 being centered by the springs 176, 177. At the same time air will be permitted to flow from the tank 40 through the pipes 218 and 219, port 54, port 95, longitudinal recess 100, port 93, port 53, pipe 125 and into the left hand end of the steering cylinder 30, thus forcing the piston 31 towards the right to swing the rudder 25 counter-clockwise to turn the boat towards the right. During this movement of the rudder, the right hand end of the cylinder 30 will be free to exhaust through the pipe 126, port 63, port 92, longitudinal recess 98, port 85 and exhaust port 61.

When it is desired to steer the boat towards the left, the movable valve members 46 and 47 are rotated through one half of a revolution each from the positions shown in Fig. 4 by closing and opening the switch 231 twice in succession, whereupon the movable valve parts 46 and 47 will be in such positions that the right hand end of the steering cylinder 30 will be in communication with the tank 40, and the left hand end of the steering cylinder 30 will be open to exhaust through the port 96 and the exhaust port 61, and the rudder 25 will be rotated clockwise to steer the boat towards the left by a process substantially the reverse of that just described for steering the boat towards the right.

When the movable valve parts 46 and 47 are in the positions shown in Fig. 4, and it is desired to operate the device 127, the switch 231 is closed, thus forcing the piston 210 towards the right from the position shown in Fig. 1, and rotating the valve sleeve 46 clockwise through 90 degrees while permitting the inner valve member 47 to remain stationary. The valve parts 46 and 47 will then be in the positions shown in Fig. 5, and if the switch 231 is permitted to remain closed for a sufficient length of time compressed air will pass through the pipe 220, port 51, annular recess 71, longitudinal recess 78, port 60 and pipe 130 and into the right hand end of the cylinder 131, thus forcing the piston 133 towards the left to operate the device 127. During this movement of the piston 133 towards the left, the left hand end of the cylinder 131 will be open to exhaust through the pipe 129, port 50, longitudinal recess 77, annular recess 70 and exhaust port 55.

During this operation, the boat will be under the control of the gyroscope, as the pipe 168 is open from the clutch cylinder 157 through the port 64, longitudinal recess 79 and exhaust port 65, and the auxiliary valve 110 will be connected to the cylinder 30, through the pipes 117 and 118, ports 52 and 62, ports 87 and 86, grooves 100 and 98, ports 91 and 90, pipes 125 and 126.

When it is desired to operate the device 128, the valve parts 46 and 47 are each rotated through one half of a revolution from the positions shown in Fig. 5 by opening and closing the switch 231 twice in succession, whereupon the left hand end of the cylinder 131 will be permitted to communicate through the pipe 129, longitudinal recess 78, port 51 and pipe 220 with the source of compressed air, and the right hand end of the cylinder 131 will be open to exhaust through the pipe 130, port 60, longitudinal passage 77 and exhaust port 55, and the piston 133 will thus be forced toward the right to operate the device 128. When the switch 231 is again opened, the piston 210 will be returned to its initial position at the left, the two racks being also moved to the left thus rotating the inner valve member 47 through ninety degrees into the position shown in Fig. 6. In this position, the boat is under the control of the gyroscope as described in connection with Fig. 2.

The hereinbefore described construction is such that the movable valve parts 46 and 47 may be moved quickly through any of the operative positions without appreciably affecting the rudder 25 or any of the operative devices 127, 128, 135 and 136. When it is desired to swing the rudder in either direction, the movable valve members 46 and 47 must be positioned either as shown in Fig. 4, or with both members rotated through 180 degrees from such a position, and the switch 231 which is open when the movable valve parts are in either of these positions must be left open for a sufficient time to permit the air to pass through the various pipes and passages, and to perform its function of pressing the piston 31 either in one direction or the other direction as the case may be, to swing the rudder 25 accordingly. When it is desired to operate any one of the devices 127, 128, 135, 136, the movable valve parts 46 and 47 must be rotated quickly into the desired position, for instance, into the position shown in Fig. 3 for operating the device 135, or into the position shown in Fig. 5 for operating the device 127, and the switch 231 which is closed when the movable valve parts are in either of these positions must be left closed for a sufficient length of time to permit the air to pass through the various passages and to perform the desired function of pushing either the piston 143 or the piston 133 towards the left to effect the operation of the corresponding device 135 or 127 as the case may be. This invention therefore provides selective means whereby any one of the number of prime movers or operative devices may be actuated in response to impulses of energy acting upon a single solenoid or element 226 through the cooperation of two cooperating movable valve members.

In the modified form of this invention shown in Figs. 17, 18, 19, 20 and 21, the construction is substantially the same as hereinbefore described, except that instead of having the system controlled by two movable valve members 46 and 47 arranged one within the other in a single valve casing 45, the system is controlled by a main valve 250 arranged to rotate in a fixed valve casing 251 and a secondary valve 252 arranged to rotate in a fixed valve casing 253, the two valves 250 and 252 being arranged to rotate coaxially and with respect to each other. The main valve casing 251 is provided with two exhaust ports 260 and 261 and is connected by two pipes 262 and 263 with the opposite ends of the auxiliary valve 111, and is connected by two pipes 265 and 266 with the opposite ends of the steering cylinder 30, and is connected by pipe 267 with the pipe 218 leading from the tank 40 or source of compressed air, and is connected by the pipe 168 with the gyroscope clutch. The main valve 250 is provided with three annular recesses, 270, 271 and 272 and with six longitudinal recesses 273, 274, 275, 276, 277 and 278, and with a longitudinal passage 279 extending longitudinally beneath the surface of the valve 250 and arranged to connect the annular recess 270 alternately with the pipes 265 and 266 without connecting the annular recess 270 at any time with either of the pipes 262 or 263. The main valve 250 is also provided with a transverse diametrical port or aperture 280 therethrough.

The secondary valve casing 253 is provided with an exhaust port 285 and is connected by pipe 286 with the inner end of the controlling cylinder 211, and is connected by two pipes 287 and 288 with the opposite ends of the cylinder 131, and is connected by two pipes 289 and 290 with the opposite ends of the cylinder 141.

The secondary valve 252 is provided with two annular recesses 295 and 296, and with four longitudinal recesses 297, 298, 299 and 300, the two last named being diametrically opposite.

For rotating the main valve 250 and the secondary valve 252, the main valve is provided with a valve stem 310 rigid therewith upon which is loosely mounted a pinion 311 which has pivotally connected thereto a spring pressed pawl 312 arranged to engage a ratchet 313 which is fixed upon the stem 310. Also loosely mounted upon the stem 310 is a pinion 315 which carries pivotally secured thereto a spring pressed pawl 316 arranged to engage a ratchet 317 which is rigidly secured to the stem 310, the pawl 316 being provided with a laterally projecting lug or follower 318 rigid therewith and arranged to be controlled by the rotation of the secondary valve 252 as will appear hereinafter.

For rotating the secondary valve 252, the secondary valve is provided with a stem 325 rigid therewith, and upon which is loosely mounted a pinion 326 which carries pivotally connected thereto a spring pressed pawl 327 which is arranged to engage a ratchet 328 which is fixedly secured to the stem 325. A cam 330 is rigidly secured to the inner end of the stem 325 and is arranged to be slidably engaged by the lug or follower 318, which is carried by the pawl 316.

For rotating the pinions 311, 315 and 325, three parallel racks 335, 336 and 337 are rigidly secured to and carried by the piston rod 207, two of these racks 335 and 337 being arranged to engage the upper sides of the two pinions 311 and 326, and the intermediate rack 336 being arranged to engage the underside of the pinion 315.

When the parts are in the positions shown in Fig. 17, the boat is under the control of the gyroscope, as previously described, the auxiliary cylinder 111 being connected to the steering cylinder 30. When now the switch 231 is closed, as for instance in response to an impulse of radiant energy or in any other suitable manner, the valve 213 will be drawn towards the left to admit air from the tank 40 into the left hand end of the cylinder 208, and will force the piston 210 towards the right and beyond the inlet to the pipe 286, thus forcing the racks 235, 236 and 237 towards the right and rotate the pinions 311 and 326 clockwise through ninety degrees, and the pinion 315 counter-clockwise through ninety degrees, as seen when viewed in the direction of the arrow C—D. This rotation of the pinions 311 and 315 will not cause any rotation of the corresponding valve stem 310, as the ratchets 313 and 317 are each provided with only two teeth, but this rotation of the pinion 315 will, however, permit the pawl 316 to move into engagement with the lower tooth of the ratchet 317. This rotation of the pinion 326 clockwise turns the valve stem 325 and the secondary valve 252 through ninety degrees clockwise under the action of the pawl 327 engaging the ratchet 328.

If now the switch 231 is permitted to remain closed for a sufficient length of time, compressed air will pass through the pipe 286, annular recess 295, longitudinal recess 298 and pipe 287, and into the left hand end of the cylinder 131, and permitting the air to exhaust from the right hand end of the cylinder 131, through the pipe 288, longitudinal passage 297, annular recess 296 and exhaust port 285. The piston 133 is thus moved toward the right to operate the upper right hand device 128, the motion of the boat itself being still under the control of the gyroscope.

When now the switch 231 is opened, as for instance by the cessation of the radiant impulse, the piston 210 will be permitted to be returned towards the left and into its initial position by the spring 211, thus moving the racks 335, 336 and 337 towards the left, and rotating the pinions 311 and 326 counter-clockwise through ninety degrees, and the pinion 315 clockwise through ninety degrees, and this return movement of the pinion 315 will cause the valve stem 310 to be rotated clockwise through ninety degrees under the action of the pawl 316 in engagement with its ratchet 317, which will cause the ratchet 313 to be rotated clockwise through ninety degrees to bring one of its teeth into engagement with the pawl 312. Compressed air will now be allowed to enter from the pipe 267 through the annular recess 271, longitudinal recess 277 and pipe 266 into the right hand end of the steering cylinder 30, the left hand of the steering cylinder 30 being free to exhaust through the pipe 265, longitudinal passage 279, annular recess 270 and exhaust port 260. At the same time, compressed air will be permitted to enter from the pipe 267 through the annular recess 271 and longitudinal passage 278 and pipe 168, and into the clutch cylinder 157 of the gyroscope, thus disconnecting the gyroscope from the arm 170. The admission of air into the right hand end of the steering cylinder 30 will push the piston 31 towards the left and swing the rudder 25 clockwise to steer the boat towards the left.

Upon again closing the switch 231, the pinion 311 will be rotated through 90 degrees in a clockwise direction, and will rotate the ratchet 313 and consequently the main valve 250 to 90 degrees clockwise or into a "neutral" position, and thus will connect the right hand end of the auxiliary valve 111 through the pipe 263, longitudinal passage 273 and pipe 266 with the right hand end of the steering cylinder 30, and will connect the left hand end of the auxiliary valve casing 111 through the pipe 262, longitudinal passage 274 and pipe 265, with the left hand end of the steering cylinder 30, and will permit the pipe 168 leading from the gyroscope to exhaust through the longitudinal recess 275, annular recess 272 and exhaust port 261, thus causing the gyroscope stem to be clutched to the swinging arm 170 and the boat to be steered upon a predetermined course under the control of the gyroscope as hereinbefore described in connection with Fig. 1.

This last closing of the switch 231 also caused the pinion 326 to be rotated in a clockwise direction through ninety degrees, thus causing the secondary valve 252 to be rotated clockwise through ninety degrees by the pawl 327 acting upon the ratchet 328, and if the switch 231 is permitted to remain closed for a sufficient length of time the compressed air will be allowed to pass through the pipe 286, longitudinal passage 298 and pipe 289 and into the left hand end of the cylinder 141, to force the piston 143 towards the right to operate the lower right hand device 136, the right hand end of the cylinder 141 being allowed to exhaust through pipe 290, longitudinal recess 297, annular recess 296 and exhaust port 285.

When the switch 231 is next opened, the pinions 311, 315 and 326 are returned to their original positions during which movement the pawl 316 is prevented from rotating the main valve 250 by the action of the lug or follower 318 sliding upon the cam 330, and thus holding the pawl 316 out of engagement with its ratchet 317. The main valve 250 is therefore not rotated on the return of the movement of the racks when the main valve 250 is in a "neutral" position.

Upon the next or third closing of the switch 231 if the switch is allowed to remain closed for a sufficient time, the air will be permitted to pass through the pipe 286 and to cause the operation of the upper left hand device 127, and when the switch is next opened to permit the pinions 311, 315 and 326 to be returned to their original positions, the main valve 250 will be rotated into such a position as to admit air to pass from the pipe 267 through the longitudinal recess 278, diametrical aperture 280 and pipe 168 leading to the gyroscope to disconnect the gyroscope from the arm 170; and the main valve 250 will be in such a position as to permit air to pass from the pipe 267 through the longitudinal passage 277 and pipe 257 into the left hand end of the steering cylinder 30, and to permit the right hand end of the steering cylinder 30 to exhaust through the pipe 266, longitudinal passage 279 and exhaust port 260, thus forcing the piston 31 towards the right to steer the boat towards the right.

Upon the next or fourth closing of the switch 231, the operation will be similar to that followed in the second closing of the switch and bringing the main valve 250 into a "neutral" position to permit the boat to be automatically controlled by the gyroscope, and if the switch is permitted to remain closed for a sufficient length of time compressed air will be permitted to pass through the pipe 286 and into the right hand end of the cylinder 141 to operate the lower left hand device 135.

Although only two of the forms in which this invention may be embodied have been shown herein, it is to be understood that the invention is not limited to any specific construction, but might be embodied in various forms without departing from the spirit of the invention or the scope of the appended claims.

Having thus fully described this invention, I claim and desire to protect by Letters Patent of the United States:

1. The combination with a plurality of independently operative fluid actuated devices, of a source of fluid pressure, and means operative in response to an impulse of energy to cause the distribution of fluid pressure from said source to one of said devices to actuate the same, and operative upon the cessation of said impulse to cause the distribution of fluid from said source to another of said devices to actuate the same.

2. The combination with a plurality of independently operative fluid actuated devices, of a source of fluid pressure, and means operative in response to an impulse of radiant energy to cause the distribution of fluid pressure from said source to one of said devices to actuate the same, and operative upon the cessation of said impulse to cause the distribution of fluid from said source to another of said devices to actuate the same.

3. The combination with a plurality of independently operative fluid actuated devices, of a source of fluid pressure, and means including a plurality of coacting separately movable valve members operative in response to an impulse of energy to cause the distribution of fluid pressure from said source to one of said devices to actuate the same, and operative upon the cessation of said impulse to cause the distribution of fluid pressure from said source to another of said devices to operate the same.

4. The combination with a plurality of independently operative fluid actuated devices, of a source of fluid pressure, and means including a plurality of rotary valve members operative in response to an impulse of energy to cause the distribution of fluid pressure from said source to one of said devices to actuate the same, and operative upon the cessation of said impulse to cause the distribution of fluid pressure from said source to another of said devices to operate the same.

5. The combination with a plurality of independently operative fluid actuated devices, of a source of fluid pressure, and means including a plurality of coaxial rotary valve members operative in response to an impulse of energy to cause the distribution of fluid pressure from said source to one of said devices to actuate the same, and operative upon the cessation of said impulse to cause the distribution of fluid pressure from said source to another of said devices to operate the same.

6. The combination with a plurality of independently operative fluid actuated devices, of a source of fluid pressure, and means including a plurality of coacting rotary valve members operative in response to an impulse of energy to cause the distribution of fluid pressure from said source to one of said devices to actuate the same, and operative upon the cessation of said impulse to cause the distribution of fluid pressure from said source to another of said devices to operate the same.

7. The combination with a plurality of independently operative fluid actuated devices, of a source of fluid pressure, and means including a plurality of separately rotatable coaxial valve members operative in response to an impulse of energy to cause the distribution of fluid pressure from said source to one of said devices to actuate the same, and operative upon the cessation of said impulse to cause the distribution of fluid pressure from said source to another of said devices to operate the same.

8. The combination with a plurality of independently operative fluid actuated devices, of a source of fluid pressure, and means including a pair of coaxially separately rotatable valve members, one of which is surrounded by the other, operative in response to an impulse of energy to cause the distribution of fluid pressure from said source to one of said devices to actuate the same, and operative upon the cessation of said impulse to cause the distribution of fluid pressure from said source to another of said devices to operate the same.

9. The combination with a plurality of independently operative fluid actuated devices, of a source of fluid pressure, and means including a plurality of coacting separately movable valve members operative in response to an impulse of radiant energy to cause the distribution of fluid pressure from said source to one of said devices to actuate the same, and operative upon the cessation of said impulse to cause the distribution of fluid pressure from said source to another of said devices to operate the same.

10. The combination with a plurality of independently operative fluid actuated devices, of a source of fluid pressure, and means including a plurality of rotary valve members operative in response to an impulse of radiant energy to cause the distribution of fluid pressure from said source to one of said devices to actuate the same, and operative upon the cessation of said impulse to cause the distribution of fluid pressure from said source to another of said devices to operate the same.

11. The combination with a plurality of independently operative fluid actuated devices, of a source of fluid pressure, and means including a plurality of coaxial rotary valve members operative in response to an impulse of radiant energy to cause the distribution of fluid pressure from said source to one of said devices to actuate the same, and operative upon the cessation of said impulse to cause the distribution of fluid pressure from said source to another of said devices to operate the same.

12. The combination with a plurality of independently operative fluid actuated devices, of a source of fluid pressure, and means including a plurality of coacting rotary valve members operative in response to an impulse of radiant energy to cause the distribution of fluid pressure from said source to one of said devices to actuate the same, and operative upon the cessation of said impulse to cause the distribution of fluid pressure from said source to another of said devices to operate the same.

13. The combination with a plurality of independently operative fluid actuated devices, of a source of fluid pressure, and means including a plurality of separately rotatable coaxial valve members operative in response to an impulse of radiant energy to cause the distribution of fluid pressure from said source to one of said devices to actuate the same, and operative upon the cessation of said impulse to cause the distribution of fluid pressure from said source to another of said devices to operate the same.

14. The combination with a plurality of independently operative fluid actuated devices, of a source of fluid pressure, and means including a pair of coaxially separately rotatable valve members, one of which is surrounded by the other, operative in response to an impulse of radiant energy to cause the distribution of fluid pressure from said source to one of said devices to actuate the same, and operative upon the cessation of said impulse to cause the distribution of fluid pressure from said source to another of said devices to operate the same.

15. The combination with a plurality of independently operative fluid actuated devices, of a source of fluid pressure, and means including a plurality of coacting separately movable valve members operative only alternately in response to radiant energy to cooperate in the distribution of fluid pressure from said source to any one of said devices selectively to actuate the same selectively.

16. The combination with a plurality of independently operative fluid actuated devices, of a source of fluid pressure, and means including a plurality of rotary valve members arranged to be rotated only alternately in response to radiant energy to cooperate in the distribution of fluid pressure from said source to any one of said devices selectively to actuate the same selectively.

17. The combination with a plurality of independently operative fluid actuated devices, of a source of fluid pressure, and means including a plurality of coaxial rotary valve members operative only alternately step by step in response to radiant energy to cooperate in the distribution of fluid pressure from said source to any one of said devices selectively to actuate the same selectively.

18. The combination with a plurality of independently operative fluid actuated devices, of a source of fluid pressure, and means including a plurality of coacting rotary valve members operative only alternately in response to radiant energy to cooperate in the distribution of fluid pressure from said source to any one of said devices selectively to actuate the same selectively.

19. The combination with a plurality of independently operative fluid actuated devices, of a source of fluid pressure, and means including a plurality of separately rotatable coaxial valve members operative only alternately in response to radiant energy to cooperate in the distribution of fluid pressure from said source to any one of said devices selectively to actuate the same selectively.

20. The combination with a plurality of independently operative fluid actuated devices, of a source of fluid pressure, and means including a pair of coaxial separately rotatable valve members, one of which is surrounded and controlled by the other, operative in response to radiant energy to cause the distribution of fluid pressure from said source to any one of said devices selectively to actuate the same selectively.

21. The combination with a dirigible body provided with steering means and carrying a plurality of independently operative devices, of means including a plurality of separately rotatable elements operative in response to radiant energy to cause either the actuation of said steering means or the actuation of any one of said devices selectively each of said elements being provided with an energy distributing conduit, and the conduit of one of said elements being controlled by another of said elements.

22. The combination with a dirigible body provided with steering means and carrying a plurality of independently operative devices, of means including a plurality of separately rotatable coaxial elements operative in response to radiant energy to cause either the actuation of said steering means or the actuation of any one of said devices selectively each of said elements being provided with a passage arranged to convey a fluid under pressure, and the passage of one of said elements being controlled by another of said elements.

23. The combination with a dirigible body provided with steering means and carrying a plurality of independently operative prime movers, of means including a plurality of separately rotatable elements operative in response to radiant energy to cause either the actuation of said steering means or the actuation of any one of said prime movers selectively each of said elements being provided with a passage arranged to convey a fluid under pressure, and one of said elements being controlled by another of said elements.

24. The combination with a dirigible body provided with steering means and carrying a plurality of independently operative prime movers, of means including a plurality of separately rotatable coaxial elements operative in response to radiant energy to cause either the actuation of said steering means or the actuation of any one of said prime movers selectively each of said elements being provided with a plurality of passages arranged to convey a fluid under pressure, and the passages of one of said elements being arranged to be moved selectively into and out of communication with corresponding passages of another of said elements.

25. The combination with a dirigible body, of steering means therefor carried thereby, direction maintaining means carried by said body and automatically operative to control said steering means to direct said body upon a predetermined course, and means responsive to an impulse of energy to modify the action of said direction maintaining means and to change the direction of movement of said body through said steering means, and operative as the result of the cessation of an impulse of energy to cause said steering means to be controlled automatically by said direction maintaining means.

26. The combination with a dirigible body, of steering means therefor carried thereby, direction maintaining means carried by said body and automatically operative to control said steering means to direct said body upon a predetermined course, and means responsive to an impulse of energy to terminate the action of said direction maintaining means and to change the direction of movement of said body through said steering means, and operative as the result of the cessation of an impulse of energy to cause said steering means to be controlled automatically by said direction maintaining means.

27. The combination with a dirigible body, of steering means therefor carried thereby, direction maintaining means carried by said body and automatically operative to control said steering means to direct said body upon a predetermined course, and means responsive to an impulse of radiant energy to modify the action of said direction maintaining means and to change the direction of movement of said body through said steering means, and operative as the result of the cessation of an impulse of radiant energy to cause said steering means to be controlled automatically by said direction maintaining means.

28. The combination with a dirigible body, of steering means therefor carried thereby, direction maintaining means carried by said body and automatically operative to control said steering means to direct said body upon a predetermined course, and means responsive to an impulse of radiant energy to terminate the action of said direction maintaining means and to change the direction of movement of said body through said steering means, and operative as the result of the cessation of an impulse of radiant energy to cause said steering means to be controlled automatically by said direction maintaining means.

29. The combination with a dirigible body, of steering means therefor carried thereby, direction maintaining means carried by said body and automatically operative upon said steering means to direct said body upon a given course, and controlling means responsive to an impulse of energy to modify the action of said direction maintaining means upon said steering means and to change the direction of movement of said body, said controlling means being operative to cause said body to be steered selectively either in one direction or in an opposite direction while said controlling means is under the influence of said energy, and said controlling means being also operative as the result of the cessation of an impulse of said energy to cause said direction maintaining means to resume full automatic control of said steering means.

30. The combination with a dirigible body, of steering means therefor carried thereby, direction maintaining means carried by said body and automatically operative upon said steering means to direct said body upon a given course, and controlling means responsive to an impulse of energy to modify the action of said direction maintaining means upon said steering means and to change the direction of movement of said body, said controlling means being operative to cause said body to be steered selectively either in one direction or in an opposite direction, and through any desired angle of rotation in either direction, while said controlling means is under the influence of said energy, and said controlling means being also operative as the result of the cessation of an impulse of said energy to cause said direction maintaining means to resume full automatic control of said steering means.

31. The combination with a dirigible body, of steering means therefor carried thereby, direction maintaining means carried by said body and automatically operative upon said steering means to direct said body upon a given course, and controlling means responsive to an impulse of radiant energy to modify the action of said direction maintaining means upon said steering means and to change the direction of movement of said body, said controlling means being operative to cause said body to be steered selectively either in one direction or in an opposite direction while said controlling means is under the influence of said radiant energy, and said controlling means being also operative as the result of the cessation of an impulse of said radiant energy to cause said direction maintaining means to resume full automatic control of said steering means.

32. The combination with a dirigible body, of steering means therefor carried thereby, direction maintaining means carried by said body and automatically operative upon said steering means to direct said body upon a given course, and controlling means responsive to an impulse of radiant energy to modify the action of said direction maintaining means upon said steering means and to change the direction of movement of said body, said controlling means being operative to cause said body to be steered selectively either in one direction or in an opposite direction, and through any desired angle of rotation in either direction, while said controlling means is under the influence of said radiant energy, and said controlling means being also operative as the result of the cessation of an impulse of said radiant energy to cause said direction maintaining means to resume full automatic control of said steering means.

Signed at New York, in the county of New York and State of New York, this twenty-eighth day of March A. D. 1916.

ALBERT DELAFIELD TRENOR.